United States Patent
El-Yamany et al.

(10) Patent No.: US 10,477,177 B2
(45) Date of Patent: Nov. 12, 2019

(54) COLOR PARAMETER ADJUSTMENT BASED ON THE STATE OF SCENE CONTENT AND GLOBAL ILLUMINATION CHANGES

(71) Applicant: Intel Corporation, Santa Clara, CA (US)

(72) Inventors: Noha El-Yamany, Kangasala (FI); Jarno Nikkanen, Kangasala (FI)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 15/843,024

(22) Filed: Dec. 15, 2017

(65) Prior Publication Data
US 2019/0045164 A1  Feb. 7, 2019

(51) Int. Cl.
| | |
|---|---|
| H04N 9/77 | (2006.01) |
| H04N 9/73 | (2006.01) |
| H04N 5/235 | (2006.01) |
| G06T 5/40 | (2006.01) |

(52) U.S. Cl.
CPC .............. H04N 9/77 (2013.01); G06T 5/40 (2013.01); H04N 5/2351 (2013.01); H04N 9/73 (2013.01)

(58) Field of Classification Search
CPC .......... H04N 9/77; H04N 9/73; H04N 5/2351; G06T 5/40
See application file for complete search history.

(56) References Cited

U.S. PATENT DOCUMENTS

| | | | |
|---|---|---|---|
| 9,386,289 B2 | 7/2016 | Tuna et al. | |
| 9,398,280 B2 | 7/2016 | Nikkanen et al. | |
| 2002/0080245 A1* | 6/2002 | Parulski | H04N 9/735 348/223.1 |
| 2009/0123086 A1* | 5/2009 | Iwanami | H04N 5/147 382/274 |

OTHER PUBLICATIONS

Drew et al., "Illumination-invariant color object recognition via compressed chromaticity histograms or color-channel-normalized images", International Conference on Computer Vision, 1998, 10 pages.
Drew et al., "Illumination-invariant image retrieval and video segmentation", Pattern Recognition, 1999, 25 pages.
Finlayson et al., "Using colour for image indexing", The Challenge of Image Retrieval, 1998, 7 pages.
Gevers et al., "Color-based object recognition", Pattern Recognition, 1999, pp. 453-464.
Swain et al., "Color indexing", International Journal of Computer Vision, Nov. 1991, pp. 11-32.

* cited by examiner

Primary Examiner — Ahmed A Berhan
(74) Attorney, Agent, or Firm — Green, Howard & Mughal LLP.

(57) ABSTRACT

An embodiment of a semiconductor package apparatus may include technology to determine first scene chromaticity information for a frame of a video sequence, determine second scene chromaticity information for another frame of the video sequence, determine a scene content change based on the first and second scene chromaticity information, and determine a global illumination change based on the first and second scene chromaticity information. Other embodiments are disclosed and claimed.

20 Claims, 10 Drawing Sheets

COLOR PARAMETER ADJUSTMENT BASED ON THE STATE OF SCENE CONTENT AND GLOBAL ILLUMINATION CHANGES

TECHNICAL FIELD

Embodiments generally relate to image processing. More particularly, embodiments relate to color parameter adjustment based on the state of scene content and global illumination changes.

BACKGROUND

In photography and image processing, color balance may refer to a global adjustment of the intensities of the colors (e.g., red, green, and blue primary colors). The color adjustment may be made to render colors correctly. A common color balance technique may be referred to as white balance. Many digital cameras include an automatic white balance feature. Automatic white balance attempts to correctly balance a scene's colors regardless of the light sources that illuminate the scene.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
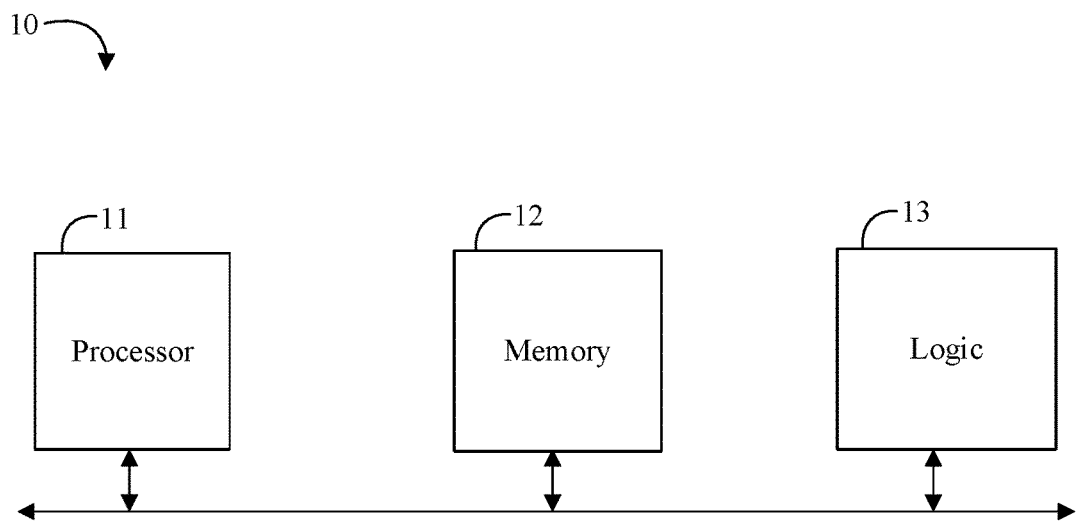
FIG. 1 is a block diagram of an example of an electronic processing system according to an embodiment.

Turning now to FIG. 1, an embodiment of an electronic processing system 10 may include a processor 11, memory 12 communicatively coupled to the processor 11, and logic 13 communicatively coupled to the processor 11 to determine first scene chromaticity information for a frame of a video sequence, determine second scene chromaticity information for another frame of the video sequence, determine a scene content change based on the first and second scene chromaticity information, and determine a global illumination change based on the first and second scene chromaticity information. In some embodiments, the logic 13 may be configured to distinguish the global illumination change from the scene content change. For example, the logic 13 may be further configured to determine first illumination-variant information and first illumination-invariant information for the first scene chromaticity information, and determine second illumination-variant information and second illumination-invariant information for the second scene chromaticity information. The logic 13 may also be configured to determine illumination-variant match information based on the first illumination-variant information with the second illumination-variant information, determine illumination-invariant match information based on the first illumination-invariant information with the second illumination-invariant information, and determine the global illumination change based on the illumination-variant match value and the illumination-invariant match value. In some embodiments, the logic 13 may be further configured to adjust a color parameter based on the determined scene content change and the determined global illumination change. For example, the logic 13 may be configured to adjust one or more of a white point parameter and an automatic white balance convergence speed parameter based on the determined scene content change and the determined global illumination change.

Embodiments of each of the above processor 11, memory 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the memory 12, persistent storage media, or other system memory may store a set of instructions which when executed by the processor 11 cause the system 10 to implement one or more components, features, or aspects of the system 10 (e.g., the logic 13, determining scene chromaticity information for frames of a video sequence, determining scene content changes based on the scene chromaticity information, determining global illumination changes based on the scene chromaticity information, adjusting a color parameter based on the determined scene content changes and the determined global illumination changes, etc.).

Figure 2:
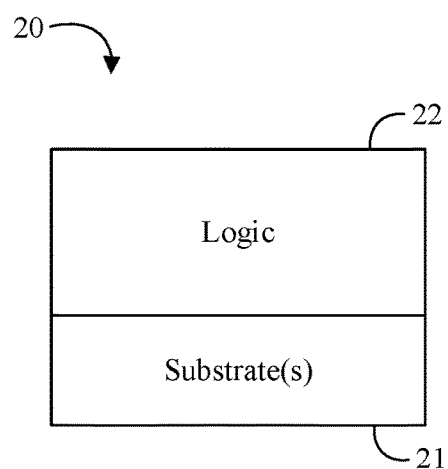
FIG. 2 is a block diagram of an example of a semiconductor package apparatus according to an embodiment.

Turning now to FIG. 2, an embodiment of a semiconductor package apparatus 20 may include one or more substrates 21, and logic 22 coupled to the one or more substrates 21, wherein the logic 22 is at least partly implemented in one or more of configurable logic and fixed-functionality hardware logic. The logic 22 coupled to the one or more substrates may be configured to determine first scene chromaticity information for a frame of a video sequence, determine second scene chromaticity information for another frame of the video sequence, determine a scene content change based on the first and second scene chromaticity information, and determine a global illumination change based on the first and second scene chromaticity information. In some embodiments, the logic 22 may be configured to distinguish the global illumination change from the scene content change. For example, the logic 22 may be further configured to determine first illumination-variant information and first illumination-invariant information for the first scene chromaticity information, and determine second illumination-variant information and second illumination-invariant information for the second scene chromaticity information. The logic 22 may also be configured to determine illumination-variant match information based on the first illumination-variant information with the second illumination-variant information, determine illumination-invariant match information based on the first illumination-invariant information with the second illumination-invariant information, and determine the global illumination change based on the illumination-variant match value and the illumination-invariant match value. In some embodiments, the logic 22 may be further configured to adjust a color parameter based on the determined scene content change and the determined global illumination change. For example, the logic 22 may be configured to adjust one or more of a white point parameter and an automatic white balance convergence speed parameter based on the determined scene content change and the determined global illumination change. In some embodiments, the logic 22 coupled to the one or more substrates 21 may include transistor channel regions that are positioned within the one or more substrates.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages. The illustrated apparatus 20 includes one or more substrates 21 (e.g., silicon, sapphire, gallium arsenide) and logic 22 (e.g., transistor array and other integrated circuit/IC components) coupled to the substrate(s) 21. The logic 22 may be implemented at least partly in configurable logic or fixed-functionality logic hardware. In one example, the logic 22 may include transistor channel regions that are positioned (e.g., embedded) within the substrate(s) 21. Thus, the interface between the logic 22 and the substrate(s) 21 may not be an abrupt junction. The logic 22 may also be considered to include an epitaxial layer that is grown on an initial wafer of the substrate(s) 21.

Figure 3A:
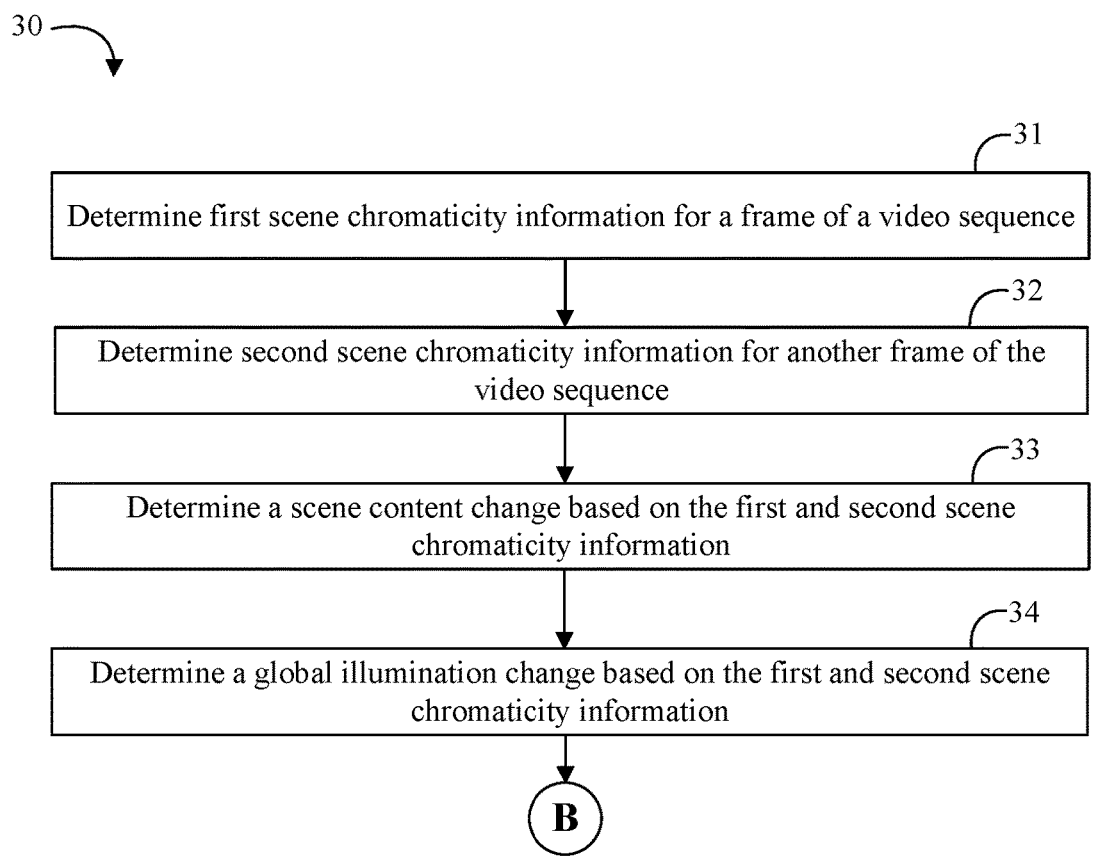
FIGS. 3A to 3B are flowcharts of an example of a method of adjusting a color parameter according to an embodiment.
Figure 3B:
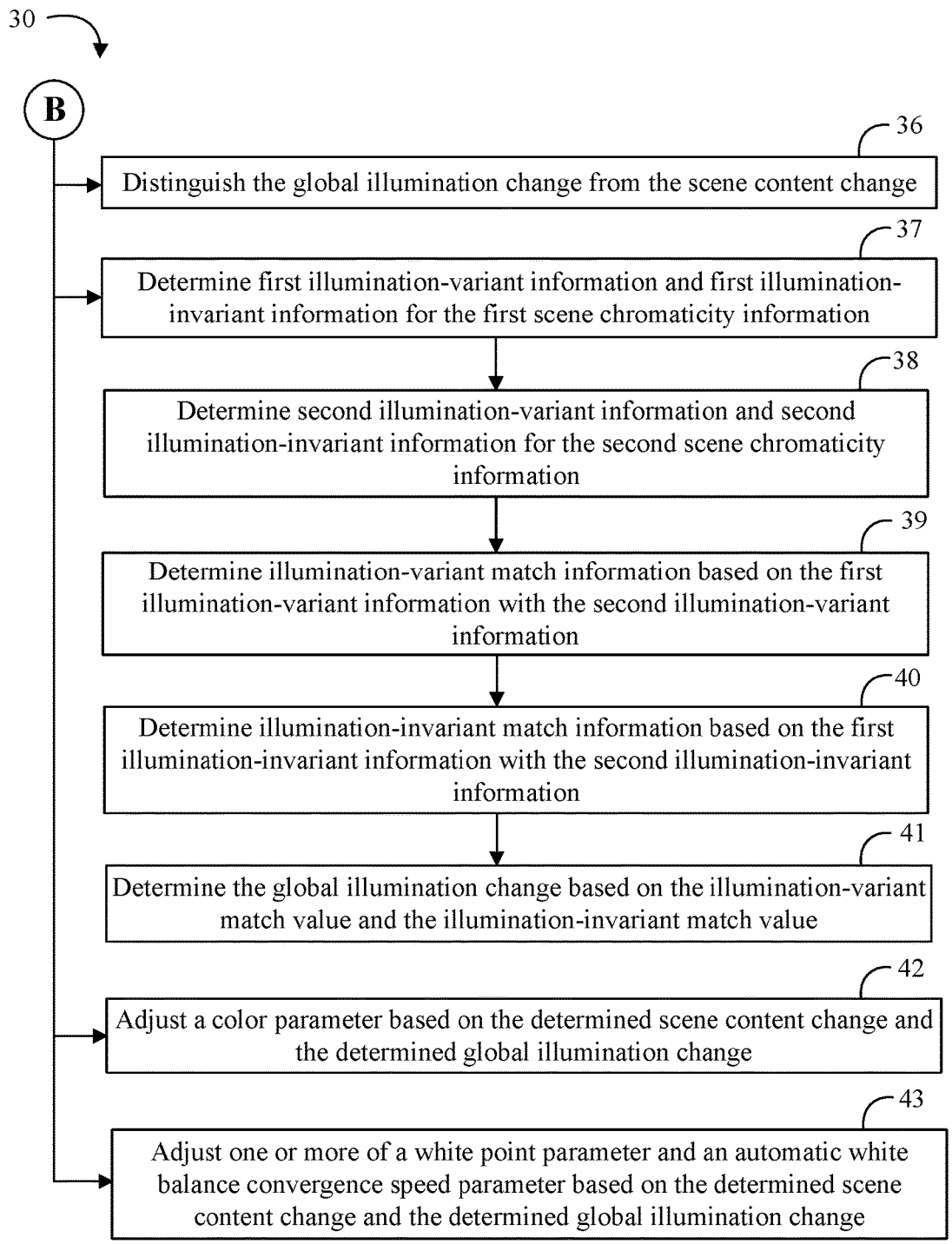

Turning now to FIGS. 3A to 3B, an embodiment of a method 30 of adjusting a color parameter may include determining first scene chromaticity information for a frame of a video sequence at block 31, determining second scene chromaticity information for another frame of the video sequence at block 32, determining a scene content change based on the first and second scene chromaticity information at block 33, and determining a global illumination change based on the first and second scene chromaticity information at block 34. Some embodiments of the method 30 may include distinguishing the global illumination change from the scene content change at block 36. For example, the method 30 may include determining first illumination-variant information and first illumination-invariant information for the first scene chromaticity information at block 37, and determining second illumination-variant information and second illumination-invariant information for the second scene chromaticity information at block 38. For example, the method 30 may also include determining illumination-variant match information based on the first illumination-variant information with the second illumination-variant information at block 39, determining illumination-invariant match information based on the first illumination-invariant information with the second illumination-invariant information at block 40, and determining the global illumination change based on the illumination-variant match value and the illumination-invariant match value at block 41. Some embodiments of the method 30 may further include adjusting a color parameter based on the determined scene content change and the determined global illumination change at block 42. For example, the method 30 may include adjusting one or more of a white point parameter and an automatic white balance convergence speed parameter based on the determined scene content change and the determined global illumination change at block 43.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 30 may be implemented on a computer readable medium as described in connection with Examples 19 to 24 below. Embodiments or portions of the method 30 may be implemented in firmware, applications (e.g., through an application programming interface (API)), or driver software running on an operating system (OS).

Figure 4:
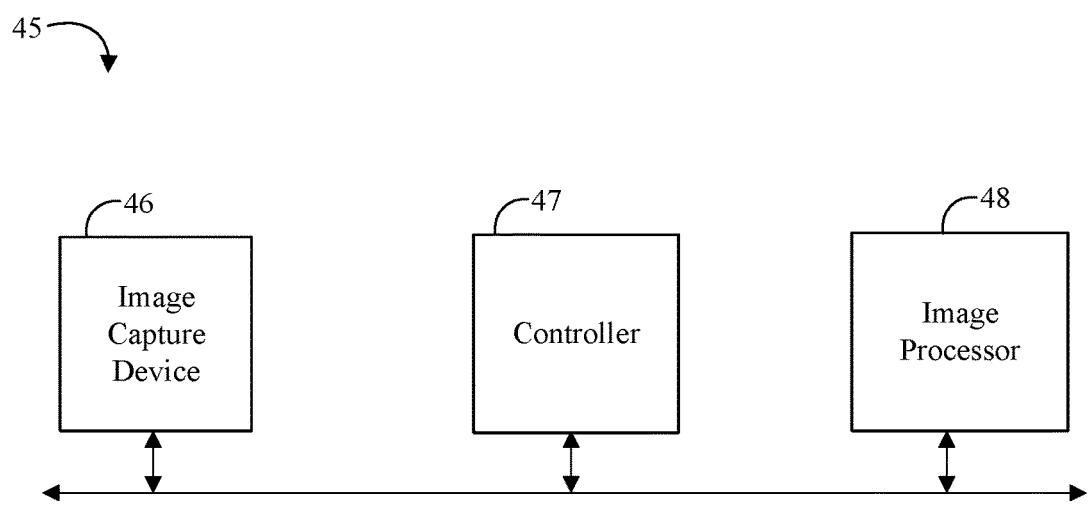
FIG. 4 is a block diagram of an example of image capture apparatus according to an embodiment.

Turning now to FIG. 4, some embodiments may be physically or logically arranged as one or more modules. For example, an embodiment of an image capture apparatus 45 may include an image capture device 46, a controller 47, and an image processor 48. The image capture device 46 may include an image sensor and may include technology to capture a sequence of images which may correspond to frames of a video sequence. Accordingly, the image capture apparatus 45 may be part of a digital camera or a video camera or camcorder. The controller 47 may include technology to control various aspects of the camera operation including various color management operations. For example, the controller 47 may control one or more of an automatic white balance, automatic white balance stabilization, color conversion from sensor color space to device independent color space, color and/or lens shading correction, color modifications for preferred color reproduction, and color appearance modeling. Various configurable parameters may be adjusted to affect the operation of the controller 47. For example, the controller 47 may include one or more color parameters which may be configured or adjusted to control various color management operations. The one or more color parameters may include a white point parameter, an automatic white balance convergence parameter, white balancing gains, convergence speed control parameters, convergence stabilization strength parameters, color conversion coefficients, shading correction gains, and/or look-up-tables.

In some embodiments, the image processor 48 may include technology to determine first scene chromaticity information for a frame of a video sequence, determine second scene chromaticity information for another frame of the video sequence, determine a scene content change based on the first and second scene chromaticity information, and determine a global illumination change based on the first and second scene chromaticity information. The controller 47 may adjust a color parameter based on the determined scene content change and the determined global illumination change. In some embodiments, the image processor 48 may be configured to distinguish the global illumination change from the scene content change. For example, the image processor 48 may be further configured to determine first illumination-variant information and first illumination-invariant information for the first scene chromaticity information, and determine second illumination-variant information and second illumination-invariant information for the second scene chromaticity information. The image processor 48 may also be configured to determine illumination-variant match information based on the first illumination-variant information with the second illumination-variant information, determine illumination-invariant match information based on the first illumination-invariant information with the second illumination-invariant information, and determine the global illumination change based on the illumination-variant match value and the illumination-invariant match value. For example, the controller 47 may be further configured to adjust a white point parameter based on the determined scene content change and the determined global illumination change, and/or to adjust an automatic white balance convergence speed based on the determined scene content change and the determined global illumination change.

Embodiments of the image capture device 46, the controller 47, the image processor 48, and other components of the image capture apparatus 45, may be implemented in hardware, software, or any combination thereof. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Some implementations may include a system-on-a-chip (SoC) device. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Some embodiments may advantageously provide technology for detection of scene content and global illumination changes for consistent color reproduction in automatic white balancing. For example, some embodiments may provide camera control technology that may be used in digital cameras. More specifically, some embodiments may provide automatic white balancing (AWB) technology. Global illumination changes and scene content changes may present challenges for performing AWB in a digital camera. AWB technology may estimate the white point (WP) in order to discount for the illumination color, and thereby achieve better color consistency. In video use cases, for example, the WP should remain unchanged under the same illuminant despite scene changes. In the presence of a global illumination change, the WP may need to be adjusted in such a way that the end user does not experience color fluctuations, abrupt color changes, or long-lasting color casts in the video. To achieve that goal, the transition from the old WP (under one illuminant) to the new WP (under another illuminant) may need to take place smoothly, and within a reasonably short convergence time, to provide consistent color reproduction and ensure a good user experience.

Some embodiments may advantageously provide WP stabilization and adaptation in the case of scene content changes and/or global illumination changes. For example, some embodiments may provide technology to detect scene content changes and global illumination changes based on temporal analysis of the scene chromaticities. Some embodiments may adjust the AWB based on the temporal analysis to provide WP stabilization/adaptation to achieve more consistent color reproduction, and a good user experience. While some embodiments herein are described in the context of AWB, some embodiments may also be applied to other color management technology for digital camera systems, such as color space conversion, color and/or lens shading correction, color appearance modeling, automatic exposure control, global and/or local tone mapping.

Some other AWB technology may apply temporal averaging, trimmed mean, or other filtering operations on the AWB results of consequent frames, with a tunable convergence time. A problem with filtering approaches is that a tradeoff needs to be made in the AWB image quality tuning between abrupt global illumination change, which requires a short convergence time, and other types of scene/illumination changes, which require a longer convergence time. Some other AWB technology may not robustly detect the state of global illumination change, nor properly distinguish the state of global illumination change from the state of scene content change only. In accordance with some embodiments, one or more of the foregoing problems may be overcome by performing temporal analysis of the scene chromaticities in a video sequence in order to derive the state of the scene content and illuminant changes. In some embodiments, the scene at a given time instance may be represented by two distinct chromaticity histograms, including one that is illumination-variant and another that is illumination-invariant. Some embodiments may match the two histograms for the scenes at different time instances to derive the state of the scene content change and/or global illumination change. The derived state(s) may then guide the AWB technology for white point stabilization and/or adaptation, to advantageously provide more consistent color reproduction (e.g., by controlling the speed of AWB convergence). Some embodiments may provide colors and color changes that are more consistent and more natural from the subjective video quality point of view.

Without being limited to theory of operation, global illumination color change may result in scaling the color channels differently, which may cause the scene chromaticities to shift in the chromaticity space (e.g., assuming a diagonal model of illumination change). Estimating the shift (e.g., a multiplicative offset) in the chromaticity domain may help to discern if the illumination color has changed (e.g., a non-unity multiplicative offset may indicate an illumination color change). Such color shift estimation, however, may be prone to errors due to the complexity of the chromaticity distributions for some scenes (e.g. the chromaticity histograms could be multimodal, cluttered and noisy), and a lower bound on the shift may need to be found, taking into consideration subjective color errors. Some embodiments may advantageously utilize illumination-invariant color models together with illumination-variant color models to detect illumination change and distinguish the illumination change from scene content change. The effect of global illumination changes on the scene chromaticities in an illumination-variant color space, for example, may result in a shift in the chromaticity domain. The effect of global illumination changes on the scene chromaticities in an illumination-invariant color space, however, may result in no shift in the chromaticity domain.

Figure 5:
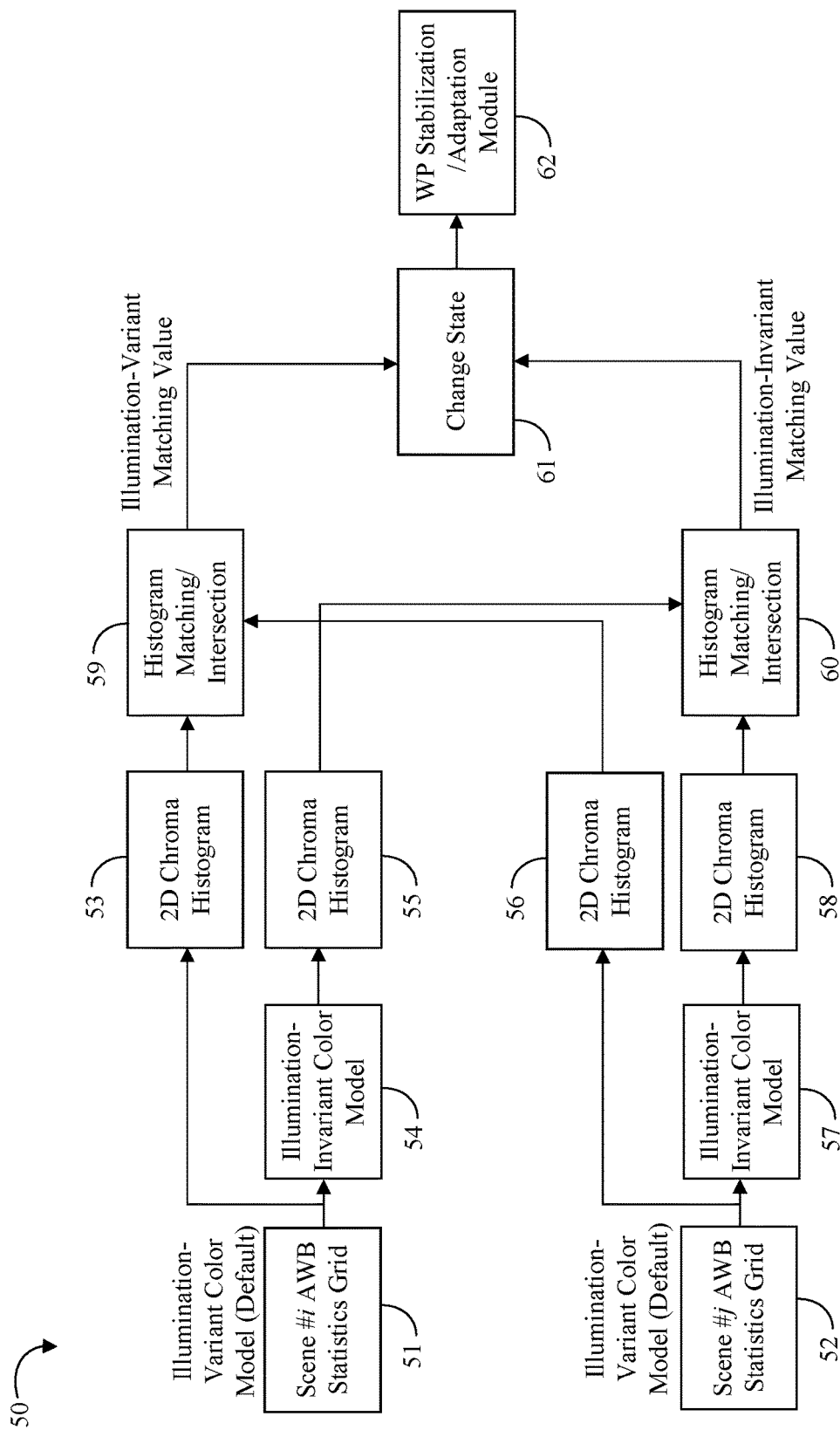
FIG. 5 is an illustrative diagram of an example of a process flow according to an embodiment.

Turning now to FIG. 5, an embodiment of a process flow 50 to perform temporal analysis of scene chromaticities is shown for scene #i and scene #j (e.g., where j is not equal to i). The scenes #i, #j at a given time instance may represented by a low-resolution image, known as the AWB statistics grid, with grid 51 corresponding to scene #i and grid 52 corresponding to scene #j. From the grid 51, a two-dimensional (2D) chromaticity histogram 53 may be calculated that is sensitive to illumination change. The grid 51 may be transformed from an illuminant-variant (e.g. RGB) color model to an illumination-invariant color model 54, in order to discount the effect of global illumination change. From the model 54, another two-dimensional (2D) chromaticity histogram 55 may be constructed that is insensitive to illumination change. Similarly, another two-dimensional (2D) chromaticity histogram 56 that is sensitive to illumination change may be calculated from the grid 52. The grid 52 may be transformed into an illumination-invariant color model 57, and another two-dimensional (2D) chromaticity histogram 58 that is insensitive to illumination change may be constructed from the model 57. Any suitable illumination-invariant color model and/or transformation technology may be used to provide the illumination-invariant color models 54, 57.

Histogram matching for the two given scenes #i, #j may then be performed based on both of the illumination-variant and illumination-invariant chromaticity histograms (e.g., j=i+N where N≥1). For example, histogram matching/intersection may be performed between the illumination-variant chromaticity histograms 53, 56 at block 59 to provide an illumination-variant matching value. Histogram matching/intersection may be performed between the illumination-invariant chromaticity histograms 55, 58 at block 60 to provide an illumination-invariant matching value. Matching the chromaticity histograms may be performed with any suitable technology. In some embodiments, matching the chromaticity histograms may utilize a histogram intersection metric, which may be robust to changes in object geometry, occlusion, cluttering and noise. The resulting two histogram matching values may then be utilized to decide the color change state at block 61. For example, the color change state may indicate whether or not the light source color has globally changed. The color change state may also indicate the condition of a scene content change. For example, the color change state may indicate whether the changes in the scene were due to global illumination changes or due to scene content changes. The color change state may be provided to a WP stabilization/adaption module 62 to guide the AWB technology for appropriate adjustments to the white point stabilization/adaptation to provide more consistent color reproduction and/or to control the speed of AWB convergence.

An example histogram matching/intersection technique may be as follows. $H_i$ and $H_j$ may denote M×M 2D chromaticity histograms constructed for scenes i and j, respectively, where i is the reference scene, i>j, and M is the histogram resolution (e.g., number of bins in each direction). The normalized intersection of the two histograms, $\mu_{i,j}$, may be determined as:

$$\mu_{i,j} = \frac{1}{A_i} \sum_{k=1}^{M} \sum_{l=1}^{M} \min\{H_i(k, l), H_j(k, l)\}$$

where $A_i = \sum_{k=1}^{M}\sum_{l=1}^{M} H_i(k,l)$ and $\mu_{i,j} \in [0.0, 1.0]$. A normalized intersection value of 1 may indicate a perfect match between the corresponding two chromaticity histograms.

An example color change state may be determined as follows. The variables $\mu_{i,j}$ and $\mu'_{i,j}$ may denote the illumination-variant and illumination-invariant chromaticity histogram matching/intersection values, respectively, between scenes i and j. The color change state may indicate a global illumination change if the following two conditions are satisfied: 1) $\mu_{i,j} < \alpha$, where $\alpha < 1$; and 2) $\mu'_{i,j} > \beta \mu_{i,j}$, where $\beta > 1$. The first condition may indicate that there is a considerable mismatch between the chromaticity histograms of scenes i and j, which may be due to change of illumination only, change in scene content only, or change of both illumination and scene content. After discounting the effect of illumination change, the intersection between the histograms may increase. The second condition may rule out a mismatch due to a scene change only, so that global illumination change is detected both in the absence and presence of scene content changes. In some embodiments, α and β may be tunable parameters. Advantageously, the color change state may also provide an indication about the state of scene content changes only, when the two conditions above are not satisfied. Advantageously, a binary value of the color change state (or a multi-bit state with an associated certainty/confidence value) may then be used to guide the AWB technology to stabilize the WP in case of scene changes only, or adapt the WP within a reasonably short convergence time in the case of global illumination changes.

Figure 6A:
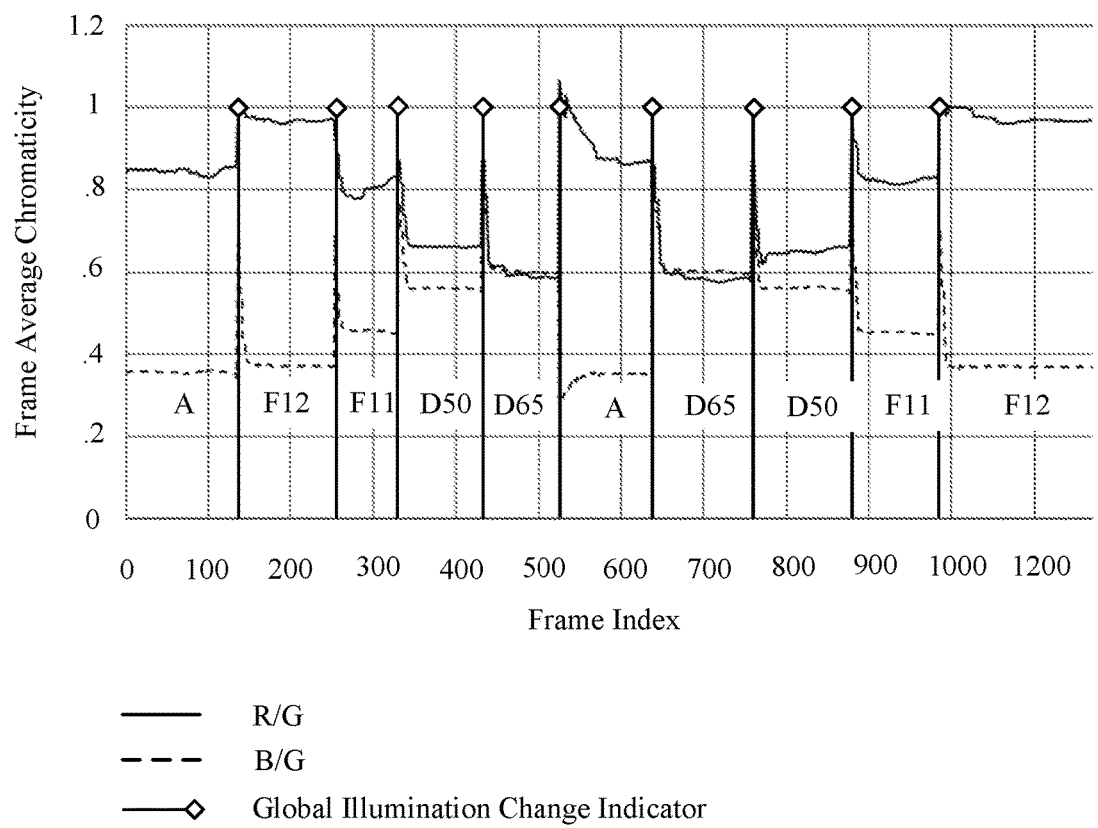
FIGS. 6A to 6C are illustrative graphs of an examples of frame average chromaticity versus frame index according to embodiments.
Figure 6B:
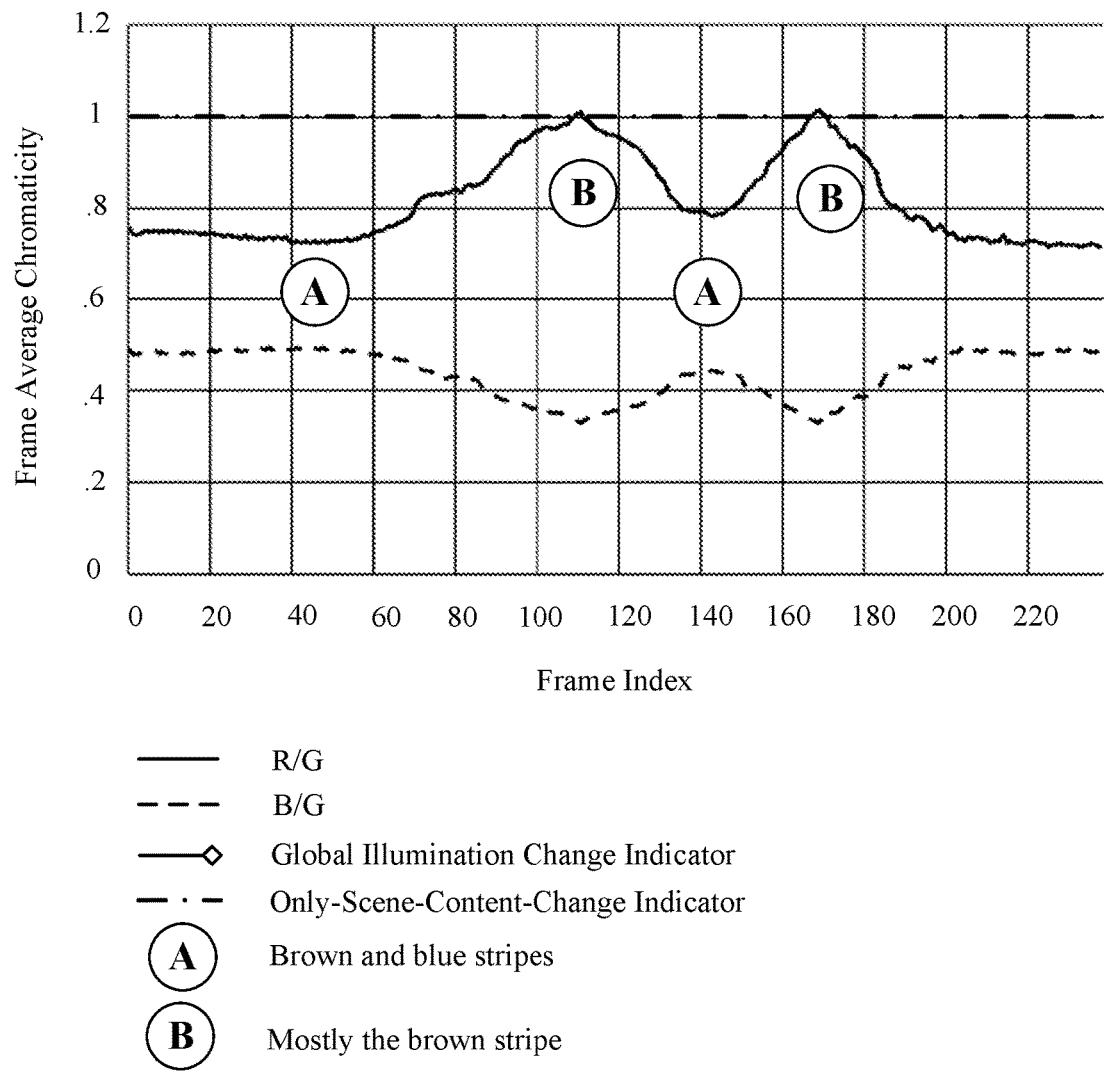
Figure 6C:
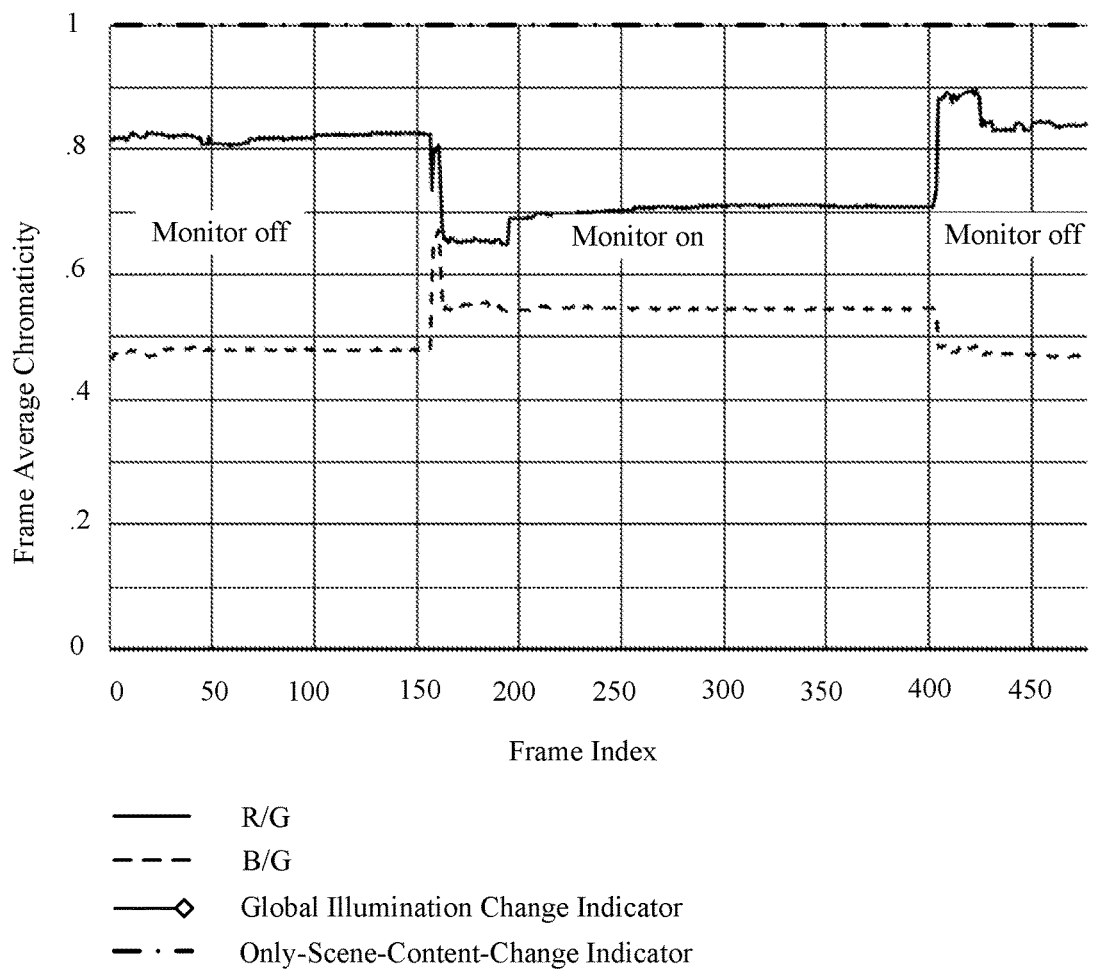

Turning now to FIGS. 6A to 6C, illustrative results on different video sequences show different examples of when a switched illumination flag may be set. In these examples, the scene j=i+N where N≥1. For FIG. 6A, the illumination is changed in a light booth in the following order A to F12 to F11 to D50 to D65 to A to D65 to D50 to F11 to F12, and scene changes (e.g., camera panning) may occur during the illumination switching. When the light is switched/globally changed in the light booth, there may sometimes be a silence/dark period (e.g., depending on the light booth design) where the frames are completely black. Some embodiments may discard such frames because they do not possess any reliable chromatic information, and hence N may sometimes be >1. As can be seen from FIG. 6A, with the proper selection of the tunable parameters, there were no false positives in this example and the embodiment of the AWB technology correctly identified the instances where the illumination was changed globally. For FIG. 6B, the illumination condition remained unchanged, while large scene changes were introduced by panning the camera rapidly over a blue-brown striped carpet. As can be seen from FIG. 6B, with proper selection of the tunable parameters, there were no false positives in this example. For FIG. 6C, the illumination condition remained unchanged, while scene changes were introduced by turning a monitor in the scene on, and then turning the monitor off. As can be seen from FIG. 6C, with proper selection of the tunable parameters, there were no false positives in this example.

Figure 7:
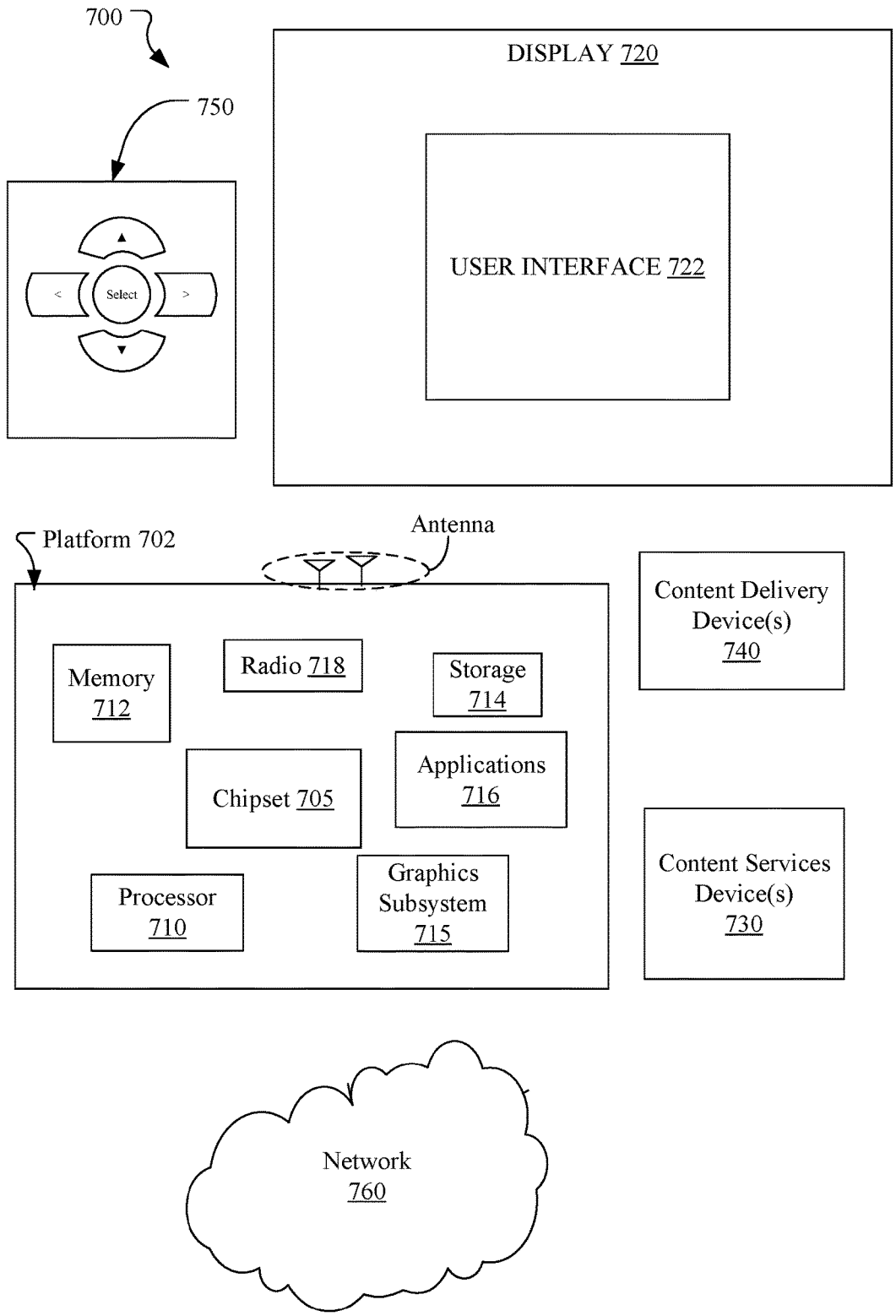
FIG. 7 is a block diagram of an example of a system having a navigation controller according to an embodiment.

FIG. 7 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, the system 700 comprises a platform 702 coupled to a display 720 that presents visual content. The platform 702 may receive video bitstream content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, the platform 702 may comprise any combination of a chipset 705, processor 710, memory 712, storage 714, graphics subsystem 715, applications 716 and/or radio 718 (e.g., network controller). The chipset 705 may provide intercommunication among the processor 710, memory 712, storage 714, graphics subsystem 715, applications 716 and/or radio 718. For example, the chipset 705 may include a storage adapter (not depicted) capable of providing intercommunication with the storage 714.

The processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, the processor 710 may comprise dual-core processor(s), dual-core mobile processor(s), and so forth.

The memory 712 may be implemented as a volatile memory device such as, but not limited to, a Random Access Memory (RAM), Dynamic Random Access Memory (DRAM), or Static RAM (SRAM).

The storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

The graphics subsystem 715 may perform processing of images such as still or video for display. The graphics subsystem 715 may be a graphics processing unit (GPU) or a visual processing unit (VPU), for example. An analog or digital interface may be used to communicatively couple the graphics subsystem 715 and display 720. For example, the interface may be any of a High-Definition Multimedia Interface (HDMI), DisplayPort, wireless HDMI, and/or wireless HD compliant techniques. The graphics subsystem 715 could be integrated into processor 710 or chipset 705. The graphics subsystem 715 could be a stand-alone card communicatively coupled to the chipset 705. In one example, the graphics subsystem 715 includes a noise reduction subsystem as described herein.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 718 may be a network controller including one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, the display 720 may comprise any television type monitor or display. The display 720 may comprise, for example, a computer display screen, touch screen display, video monitor, television-like device, and/or a television. The display 720 may be digital and/or analog. In embodiments, the display 720 may be a holographic display. Also, the display 720 may be a transparent surface that may receive a visual projection. Such projections may convey various forms of information, images, and/or objects. For example, such projections may be a visual overlay for a mobile augmented reality (MAR) application. Under the control of one or more software applications 716, the platform 702 may display user interface 722 on the display 720.

In embodiments, content services device(s) 730 may be hosted by any national, international and/or independent service and thus accessible to the platform 702 via the Internet, for example. The content services device(s) 730 may be coupled to the platform 702 and/or to the display 720. The platform 702 and/or content services device(s) 730 may be coupled to a network 760 to communicate (e.g., send and/or receive) media information to and from network 760. The content delivery device(s) 740 also may be coupled to the platform 702 and/or to the display 720.

In embodiments, the content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

The content services device(s) 730 receives content such as cable television programming including media information, digital information, and/or other content. Examples of content providers may include any cable or satellite television or radio or Internet content providers. The provided examples are not meant to limit embodiments.

In embodiments, the platform 702 may receive control signals from a navigation controller 750 having one or more navigation features. The navigation features of the controller 750 may be used to interact with the user interface 722, for example. In embodiments, the navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of the controller 750 may be echoed on a display (e.g., display 720) by movements of a pointer, cursor, focus ring, or other visual indicators displayed on the display. For example, under the control of software applications 716, the navigation features located on the navigation controller 750 may be mapped to virtual navigation features displayed on the user interface 722, for example. In embodiments, the controller 750 may not be a separate component but integrated into the platform 702 and/or the display 720. Embodiments, however, are not limited to the elements or in the context shown or described herein.

In embodiments, drivers (not shown) may comprise technology to enable users to instantly turn on and off the platform 702 like a television with the touch of a button after initial boot-up, when enabled, for example. Program logic may allow the platform 702 to stream content to media adaptors or other content services device(s) 730 or content delivery device(s) 740 when the platform is turned "off." In addition, chipset 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in the system 700 may be integrated. For example, the platform 702 and the content services device(s) 730 may be integrated, or the platform 702 and the content delivery device(s) 740 may be integrated, or the platform 702, the content services device(s) 730, and the content delivery device(s) 740 may be integrated, for example. In various embodiments, the platform 702 and the display 720 may be an integrated unit. The display 720 and content service device(s) 730 may be integrated, or the display 720 and the content delivery device(s) 740 may be integrated, for example. These examples are not meant to limit the embodiments.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

The platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 7.

Figure 8:
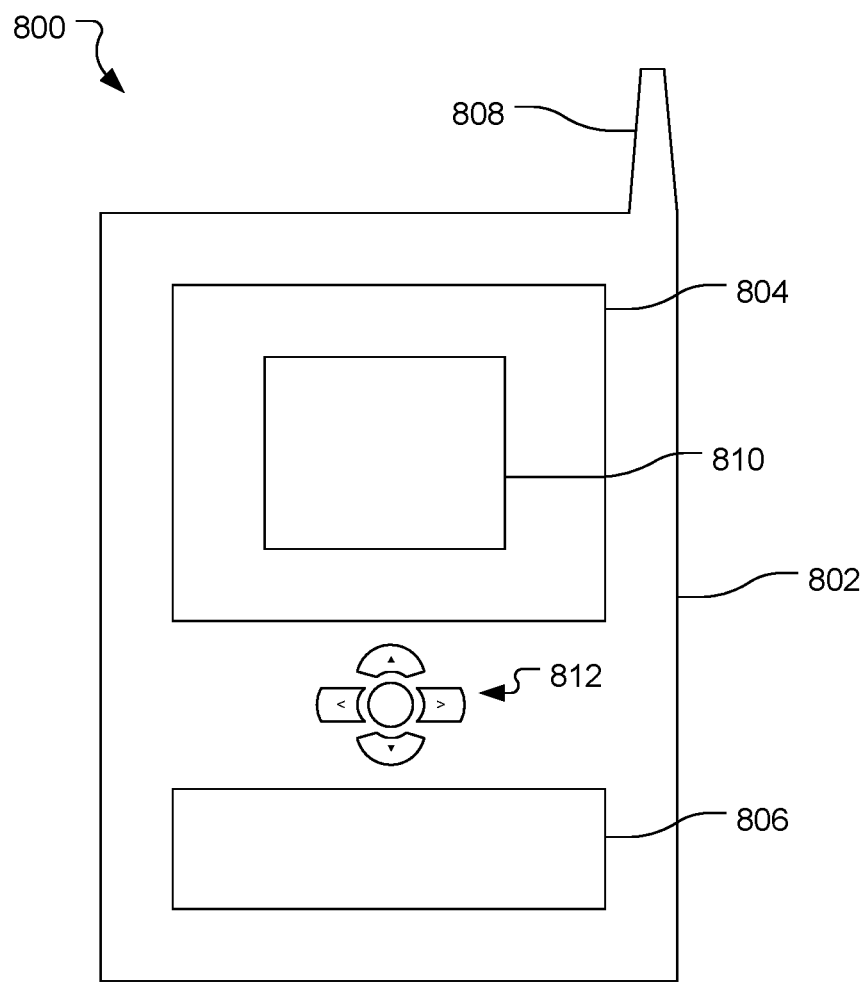
FIG. 8 is a block diagram of an example of a system having a small form factor according to an embodiment.

As described above, the system 700 may be embodied in varying physical styles or form factors. FIG. 8 illustrates embodiments of a small form factor device 800 in which the system 700 may be embodied. In embodiments, for example, the device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 8, the device 800 may comprise a housing 802, a display 804, an input/output (I/O) device 806, and an antenna 808. The device 800 also may comprise navigation features 812. The display 804 may comprise any suitable display unit for displaying information appropriate for a mobile computing device. The I/O device 806 may comprise any suitable I/O device for entering information into a mobile computing device. Examples for the I/O device 806 may include an alphanumeric keyboard, a numeric keypad, a touch pad, input keys, buttons, switches, rocker switches, microphones, speakers, voice recognition device and software, and so forth. Information also may be entered into the device 800 by way of microphone. Such information may be digitized by a voice recognition device. The embodiments are not limited in this context.

In some embodiments, the system 700 and/or the device 800 may include one or more aspects described herein related to color parameter adjustment based on scene content and global illumination. In particular, the system 700 and/or the device 800 may include one or more of the features described in the below Examples.

ADDITIONAL NOTES AND EXAMPLES

Example 1 may include an electronic processing system, comprising a processor, memory communicatively coupled to the processor, and logic communicatively coupled to the processor to determine first scene chromaticity information for a frame of a video sequence, determine second scene chromaticity information for another frame of the video sequence, determine a scene content change based on the first and second scene chromaticity information, and determine a global illumination change based on the first and second scene chromaticity information.

Example 2 may include the system of Example 1, wherein the logic is further to distinguish the global illumination change from the scene content change.

Example 3 may include the system of Example 1, wherein the logic is further to determine first illumination-variant information and first illumination-invariant information for the first scene chromaticity information, and determine second illumination-variant information and second illumination-invariant information for the second scene chromaticity information.

Example 4 may include the system of Example 3, wherein the logic is further to determine illumination-variant match information based on the first illumination-variant information with the second illumination-variant information, determine illumination-invariant match information based on the first illumination-invariant information with the second illumination-invariant information, and determine the global illumination change based on the illumination-variant match value and the illumination-invariant match value.

Example 5 may include the system of any of Examples 1 to 4, wherein the logic is further to adjust a color parameter based on the determined scene content change and the determined global illumination change.

Example 6 may include the system of any of Examples 1 to 4, wherein the logic is further to adjust one or more of a white point parameter and an automatic white balance convergence speed parameter based on the determined scene content change and the determined global illumination change.

Example 7 may include a semiconductor package apparatus, comprising one or more substrates, and logic coupled to the one or more substrates, wherein the logic is at least partly implemented in one or more of configurable logic and fixed-functionality hardware logic, the logic coupled to the one or more substrates to determine first scene chromaticity information for a frame of a video sequence, determine second scene chromaticity information for another frame of the video sequence, determine a scene content change based on the first and second scene chromaticity information, and determine a global illumination change based on the first and second scene chromaticity information.

Example 8 may include the apparatus of Example 7, wherein the logic is further to distinguish the global illumination change from the scene content change.

Example 9 may include the apparatus of Example 7, wherein the logic is further to determine first illumination-variant information and first illumination-invariant information for the first scene chromaticity information, and determine second illumination-variant information and second illumination-invariant information for the second scene chromaticity information.

Example 10 may include the apparatus of Example 9, wherein the logic is further to determine illumination-variant match information based on the first illumination-variant information with the second illumination-variant information, determine illumination-invariant match information based on the first illumination-invariant information with the second illumination-invariant information, and determine the global illumination change based on the illumination-variant match value and the illumination-invariant match value.

Example 11 may include the apparatus of any of Examples 7 to 10, wherein the logic is further to adjust a color parameter based on the determined scene content change and the determined global illumination change.

Example 12 may include the apparatus of any of Examples 7 to 10, wherein the logic is further to adjust one or more of a white point parameter and an automatic white balance convergence speed parameter based on the determined scene content change and the determined global illumination change.

Example 13 may include a method of adjusting a color parameter, comprising determining first scene chromaticity information for a frame of a video sequence, determining second scene chromaticity information for another frame of the video sequence, determining a scene content change based on the first and second scene chromaticity information, and determining a global illumination change based on the first and second scene chromaticity information.

Example 14 may include the method of Example 13, further comprising distinguishing the global illumination change from the scene content change.

Example 15 may include the method of Example 13, further comprising determining first illumination-variant information and first illumination-invariant information for the first scene chromaticity information, and determining second illumination-variant information and second illumination-invariant information for the second scene chromaticity information.

Example 16 may include the method of Example 15, further comprising determining illumination-variant match information based on the first illumination-variant information with the second illumination-variant information, determining illumination-invariant match information based on the first illumination-invariant information with the second illumination-invariant information, and determining the global illumination change based on the illumination-variant match value and the illumination-invariant match value.

Example 17 may include the method of any of Examples 13 to 16, further comprising adjusting a color parameter based on the determined scene content change and the determined global illumination change.

Example 18 may include the method of any of Examples 13 to 16, further comprising adjusting one or more of a white point parameter and an automatic white balance convergence speed parameter based on the determined scene content change and the determined global illumination change.

Example 19 may include at least one computer readable medium, comprising a set of instructions, which when executed by a computing device, cause the computing device to determine first scene chromaticity information for a frame of a video sequence, determine second scene chromaticity information for another frame of the video sequence, determine a scene content change based on the first and second scene chromaticity information, and determine a global illumination change based on the first and second scene chromaticity information.

Example 20 may include the at least one computer readable medium of Example 19, comprising a further set of instructions, which when executed by the computing device, cause the computing device to distinguish the global illumination change from the scene content change.

Example 21 may include the at least one computer readable medium of Example 19, comprising a further set of instructions, which when executed by the computing device, cause the computing device to determine first illumination-variant information and first illumination-invariant information for the first scene chromaticity information, and determine second illumination-variant information and second illumination-invariant information for the second scene chromaticity information.

Example 22 may include the at least one computer readable medium of Example 21, comprising a further set of instructions, which when executed by the computing device, cause the computing device to determine illumination-variant match information based on the first illumination-variant information with the second illumination-variant information, determine illumination-invariant match information based on the first illumination-invariant information with the second illumination-invariant information, and determine the global illumination change based on the illumination-variant match value and the illumination-invariant match value.

Example 23 may include the at least one computer readable medium of any of Examples 19 to 22, comprising a further set of instructions, which when executed by the computing device, cause the computing device to adjust a color parameter based on the determined scene content change and the determined global illumination change.

Example 24 may include the at least one computer readable medium of any of Examples 19 to 22, comprising a further set of instructions, which when executed by the computing device, cause the computing device to adjust one or more of a white point parameter and an automatic white balance convergence speed parameter based on the determined scene content change and the determined global illumination change.

Example 25 may include a color balance apparatus, comprising means for determining first scene chromaticity information for a frame of a video sequence, means for determining second scene chromaticity information for another frame of the video sequence, means for determining a scene content change based on the first and second scene chromaticity information, and means for determining a global illumination change based on the first and second scene chromaticity information.

Example 26 may include the apparatus of Example 25, further comprising means for distinguishing the global illumination change from the scene content change.

Example 27 may include the apparatus of Example 25, further comprising means for determining first illumination-variant information and first illumination-invariant information for the first scene chromaticity information, and means for determining second illumination-variant information and second illumination-invariant information for the second scene chromaticity information.

Example 28 may include the apparatus of Example 27, further comprising means for determining illumination-variant match information based on the first illumination-variant information with the second illumination-variant information, means for determining illumination-invariant match information based on the first illumination-invariant information with the second illumination-invariant information, and means for determining the global illumination change based on the illumination-variant match value and the illumination-invariant match value.

Example 29 may include the apparatus of any of Examples 25 to 28, further comprising means for adjusting a color parameter based on the determined scene content change and the determined global illumination change.

Example 30 may include the apparatus of any of Examples 25 to 28, further comprising means for adjusting one or more of a white point parameter and an automatic white balance convergence speed parameter based on the determined scene content change and the determined global illumination change.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
a processor;
memory communicatively coupled to the processor; and
logic communicatively coupled to the processor to:
 determine first scene chromaticity information for a frame of a video sequence,
 determine second scene chromaticity information for another frame of the video sequence,
 determine first illumination-variant information and first illumination-invariant information for the first scene chromaticity information,
 determine second illumination-variant information and second illumination-invariant information for the second scene chromaticity information,
 determine a scene content change based on the first and second scene chromaticity information, and
 detect a global illumination change in the video sequence based on the first and second scene chromaticity information.

2. The system of claim 1, wherein the logic is further to:
distinguish the global illumination change from the scene content change.

3. The system of claim 1, wherein the logic is further to:
determine illumination-variant match information based on the first illumination-variant information with the second illumination-variant information;
determine illumination-invariant match information based on the first illumination-invariant information with the second illumination-invariant information; and
determine the global illumination change based on the illumination-variant match value and the illumination-invariant match value.

4. The system of claim 1, wherein the logic is further to:
adjust a color parameter based on the determined scene content change and the determined global illumination change.

5. An electronic processing system comprising:
a processor;
memory communicatively coupled to the processor; and
logic communicatively coupled to the processor to:
 determine first scene chromaticity information for a frame of a video sequence,
 determine second scene chromaticity information for another frame of the video sequence,
 determine a scene content change based on the first and second scene chromaticity information,
 determine a global illumination change based on the first and second scene chromaticity information, and
 adjust one or more of a white point parameter and an automatic white balance convergence speed parameter based on the determined scene content change and the determined global illumination change.

6. A semiconductor package apparatus, comprising:
one or more substrates; and
logic coupled to the one or more substrates, wherein the logic is at least partly implemented in one or more of configurable logic and fixed-functionality hardware logic, the logic coupled to the one or more substrates to:
 determine first scene chromaticity information for a frame of a video sequence,
 determine second scene chromaticity information for another frame of the video sequence,
 determine first illumination-variant information and first illumination-invariant information for the first scene chromaticity information,
 determine second illumination-variant information and second illumination-invariant information for the second scene chromaticity information,
 determine a scene content change based on the first and second scene chromaticity information, and
 detect a global illumination change in the video sequence based on the first and second scene chromaticity information.

7. The apparatus of claim 6, wherein the logic is further to:
distinguish the global illumination change from the scene content change.

8. The apparatus of claim 6, wherein the logic is further to:
determine illumination-variant match information based on the first illumination-variant information with the second illumination-variant information;
determine illumination-invariant match information based on the first illumination-invariant information with the second illumination-invariant information; and
determine the global illumination change based on the illumination-variant match value and the illumination-invariant match value.

9. The apparatus of claim 6, wherein the logic is further to:
adjust a color parameter based on the determined scene content change and the determined global illumination change.

10. A semiconductor package apparatus comprising:
one or more substrates; and
logic coupled to the one or more substrates, wherein the logic is at least partly implemented in one or more of configurable logic and fixed-functionality hardware logic, the logic coupled to the one or more substrates to:
 determine first scene chromaticity information for a frame of a video sequence,
 determine second scene chromaticity information for another frame of the video sequence,
 determine a scene content change based on the first and second scene chromaticity information,
 determine a global illumination change based on the first and second scene chromaticity information, and adjust one or more of a white point parameter and an automatic white balance convergence speed parameter based on the determined scene content change and the determined global illumination change.

11. A method of adjusting a color parameter, comprising:
determining first scene chromaticity information for a frame of a video sequence;
determining second scene chromaticity information for another frame of the video sequence;
determining first illumination-variant information and first illumination-invariant information for the first scene chromaticity information;
determining second illumination-variant information and second illumination-invariant information for the second scene chromaticity information;
determining a scene content change based on the first and second scene chromaticity information; and
detecting a global illumination change in the video sequence based on the first and second scene chromaticity information.

12. The method of claim 11, further comprising:
distinguishing the global illumination change from the scene content change.

13. The method of claim 11, further comprising:
determining illumination-variant match information based on the first illumination-variant information with the second illumination-variant information;
determining illumination-invariant match information based on the first illumination-invariant information with the second illumination-invariant information; and
determining the global illumination change based on the illumination-variant match value and the illumination-invariant match value.

14. The method of claim 11, further comprising:
adjusting a color parameter based on the determined scene content change and the determined global illumination change.

15. A method of adjusting a color parameter, comprising:
determining first scene chromaticity information for a frame of a video sequence;
determining second scene chromaticity information for another frame of the video sequence;
determining a scene content change based on the first and second scene chromaticity information;
detecting a global illumination change in the video sequence based on the first and second scene chromaticity information; and
adjusting one or more of a white point parameter and an automatic white balance convergence speed parameter based on the determined scene content change and the determined global illumination change.

16. At least one non-transitory computer readable medium, comprising a set of instructions, which when executed by a computing device, cause the computing device to:
determine first scene chromaticity information for a frame of a video sequence;
determine second scene chromaticity information for another frame of the video sequence;
determine first illumination-variant information and first illumination-invariant information for the first scene chromaticity information;
determine second illumination-variant information and second illumination-invariant information for the second scene chromaticity information;
determine a scene content change based on the first and second scene chromaticity information; and
detect a global illumination change in the video sequence based on the first and second scene chromaticity information.

17. The at least one non-transitory computer readable medium of claim 16, comprising a further set of instructions, which when executed by the computing device, cause the computing device to:
distinguish the global illumination change from the scene content change.

18. The at least one non-transitory computer readable medium of claim 16, comprising a further set of instructions, which when executed by the computing device, cause the computing device to:
determine illumination-variant match information based on the first illumination-variant information with the second illumination-variant information;
determine illumination-invariant match information based on the first illumination-invariant information with the second illumination-invariant information; and
determine the global illumination change based on the illumination-variant match value and the illumination-invariant match value.

19. The at least one non-transitory computer readable medium of claim 16, comprising a further set of instructions, which when executed by the computing device, cause the computing device to:
adjust a color parameter based on the determined scene content change and the determined global illumination change.

20. At least one non-transitory computer readable medium, comprising a set of instructions, which when executed by a computing device, cause the computing device to:
determine first scene chromaticity information for a frame of a video sequence;
determine second scene chromaticity information for another frame of the video sequence;
determine a scene content change based on the first and second scene chromaticity information;
detect a global illumination change in the video sequence based on the first and second scene chromaticity information; and
adjust one or more of a white point parameter and an automatic white balance convergence speed parameter based on the determined scene content change and the determined global illumination change.

* * * * *